Dec. 13, 1938.  L. L. MALLARD  2,140,295
UNIVERSAL JOINT
Filed Jan. 18, 1937
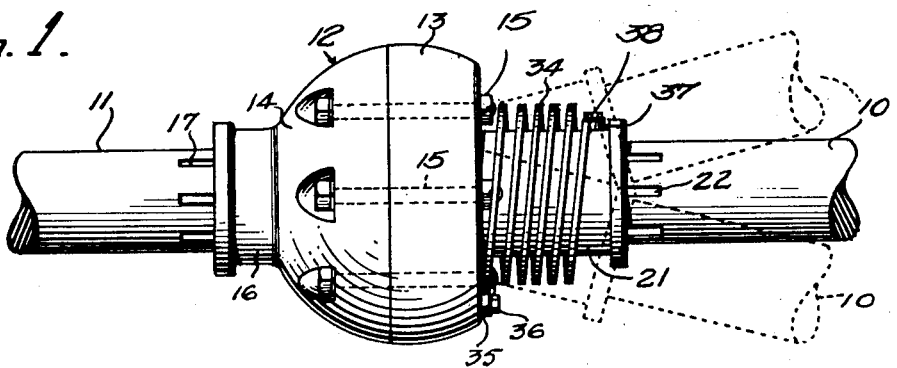
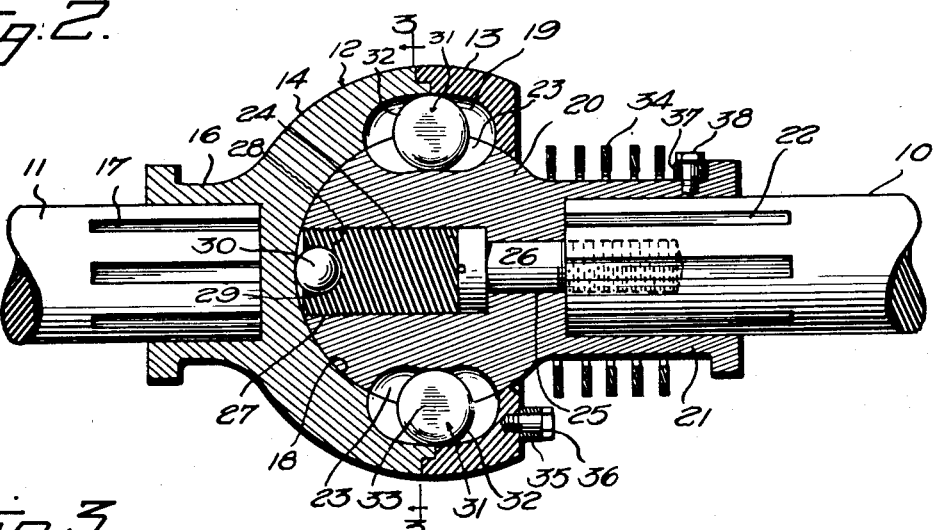
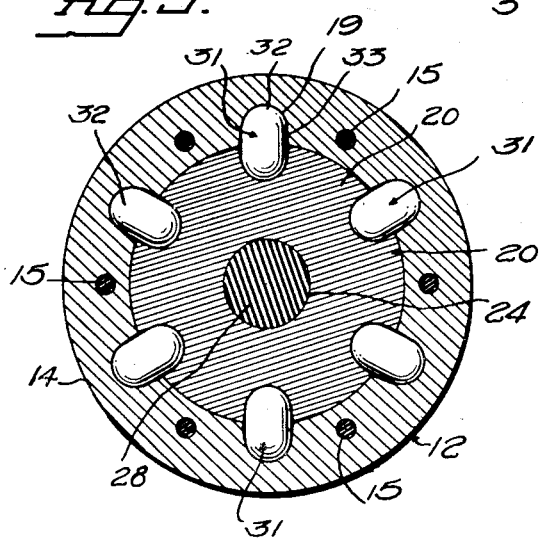
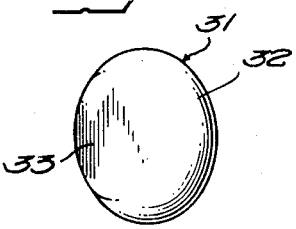
Inventor
LOGAN L. MALLARD
By C. L. Parker
Attorney Patented Dec. 13, 1938

2,140,295

UNITED STATES PATENT OFFICE 2,140,295

UNIVERSAL JOINT

Logan L. Mallard, Norfolk, Va.

Application January 18, 1937, Serial No. 121,218

19 Claims. (Cl. 64—7)

This invention relates to universal joints, specifically of the ball and socket type and features improved means for transmitting motion between the elements of the joint while permitting them to assume different relative positions with respect to each other.

An object of the invention is to provide a unispherical elements as the motion transmitting motion between its elements are adapted to withstand relatively hard usage without the wear and breakage which occurs through the use of spherical elements at the motion transmitting means in known forms of universal joints.

A further object is to provide a device of the character referred to wherein the motion transmitting devices normally present greater areas of contact against the walls of the grooves in the adjacent faces of the ball and socket than with known structures, thus materially reducing the wearing of the parts.

A further object is to provide a device of this character having means for minimizing backlash between the coupled joint elements, thus further reducing the wearing of the parts.

A further object is to provide resilient means operating to take up play between the parts in the direction of their normal rotation, thus minimizing backlash and greatly lengthening the usefull life of the device.

Other objects and advantages of the invention will become apparent during the course of the following description.

In the drawing I have shown one embodiment of the invention. In this showing—

Figure 1 is a side elevation,

Figure 2 is a central axial sectional view with the coupled shafts shown in axial alignment, parts being shown in elevation, Figure 3 is a section on line 3—3 of Figure 2, and, Figure 4 is a detail perspective view of one of the motion transmitting elements.

Referring to Figures 1 and 2, the numerals 10 and 11 indicate a pair of coupled shaft sections, of which the shaft 10 may be the drive shaft and the shaft 11 the driven shaft. A socket 12 forming one of the joint elements is adapted to rotate with the shaft 11 and is formed of sections 13 and 14 which are rigidly secured to each other by means of bolts 15 circumferentially spaced from each other and arranged parallel to the axis of the shaft 11. The socket section 14 is provided with an axial projection 16, splined on the shaft 11 as at 17. The socket 12 is provided with an internal spherical surface 18, and a plurality of circumferentially spaced grooves 19 are formed within the socket 12, each of these grooves lying in a plane coincident with the axis of the shaft 11.

A ball 20 forming the coacting element of the joint is adapted to rotate with the shaft 10, and is provided with an axially extending sleeve 21 keyed or splined as at 22 on the shaft 10. The ball 20 has a spherical outer surface adapted to fit within the socket 12, as will be apparent. A plurality of circumferentially spaced grooves 23 are formed in the ball 20, the grooves 23 corresponding in number and arrangement with the grooves 19 at each line in a plane coincident with the axis of the shaft 10.

The ball 20 is provided with an axial recess 24 and the inner end of this recess communicates with an axial opening 25 of smaller diameter. A screw 26 extends through the opening 25 and is threaded in the adjacent end of the shaft 10, the head of the screw being arranged in the inner end of the recess 24. It will be apparent that the screw 26 positively secures the ball 20 against axial movement with respect to the shaft 10.

The left hand end of the recess 24, as viewed in Figure 2, is internally threaded as at 27 for the reception of a plug 28, the inner end of which is adapted to seat against the head of the screw 26. The free end of the plug 28 is axially recessed as at 29 to receive a thrust ball 30 which engages against the spherical surface 18 of the socket 12.

A motion transmitting device 31 is adapted to be arranged in each corresponding pair of grooves 19 and 23 with a slight clearance between each device and its associated grooves. Each device 31 is provided with a peripheral portion 32 which is substantially semi-circular in cross-section, each groove 19 and 23 having its innermost portion similarly shaped. Considered in planes containing the axis of rotation of the shafts the devices 31 are circular in cross section as shown in side elevation in Fig. 2. Considered in planes at right angles to these axes, the peripheral outlines of the devices are cycloidal except that the crown portions at opposite sides of each device 31 are substantially flat as at 33, as clearly shown in Figure 3.

The sleeve 21 is preferably surrounded by a torsion spring 34 having one end 35 secured by a screw 36 or other fastening element to the socket member 13. The other end 37 of the spring is secured by a screw or the like 38 to the sleeve 21.

The operation of the device is as follows:

It will be apparent that rotation of the shaft 10 in either direction transmits corresponding rotation to the shaft 11, the motion transmitting devices 31 serving as a positive driving connection between the socket 12 and ball 20. In prior constructions of this general character it has been the common practice to employ spherical elements in place of the devices 31, but the use of spherical elements is disadvantageous for the reason that each spherical element engages at a single point with the ball and with the socket, thus resulting in unduly rapid wear of the ball and socket. Moreover, such single points of contact, particularly after substantial wear has taken place and backlash has developed are disadvantageous for the reason that the taking up of play under heavy torque conditions subjects the spherical elements to heavy loads at the single points referred to. Such subjection of the balls to heavy thrusts often results in the fracture of the balls.

With the present construction, the use of the devices 31 materially increases the areas of contact between the devices 31 and the grooves 19 and 23, thus resulting in a greatly retarded wearing of the parts. Moreover, the motion transmitting devices are not subjected to heavy thrusts at restricted points, and accordingly these elements are adapted to withstand sudden heavy loads without being broken or fractured.

The ball 12 is formed of separate sections to facilitate the introduction of the devices 31, and also to permit the socket to extend on opposite sides of a plane through the center of the ball 20 at right angles to the axis of the shaft 10. As previously stated, the axial projection 16 is splined on the shaft 11 as at 17, and accordingly the socket 12 is free for axial movement with the ball 20 to compensate for relative axial movement of the shafts 10 and 11 under varying driving conditions. For example, if the present device is employed in connection with the propeller shaft of a motor vehicle, any increase in the angularity between the shafts 10 and 11 results in an elongation of the propeller shaft, which is compensated for by free sliding movement of the projection 16 on the shaft 11. The shafts 10 and 11, of course, are adapted to move to relative angular positions by the turning of the ball 20 in the socket 12, the devices 31 preventing relative rotation between these elements, and thus providing positive driving connections between the parts. The ball 30 acts as an effective thrust bearing between the ball 20 and socket 12, as will be apparent, and this ball is arranged in the socket 29 of the plug 28, which element positively prevents displacement of the screw 26.

In any device of the present character, certain limited play exists between the parts, and such play increases very slowly in the present device due to the characteristics of the devices 31, as previously described. The spring 34 provides means in addition to the particular characteristics of the devices 31 for minimizing the wearing of the parts incident to sudden reverse rotations of the shafts 10 and 11. In any installation, for example in a motor vehicle propeller shaft, the shafts 10 and 11 rotate in the same direction during the greater portion of the periods of operation of the apparatus. The torsion spring 34 tends to rotate the shafts 10 and 11 with respect to each other, this rotation, of course, being prevened by the elements 31. The spring 34, however, takes up what minor play exists between the parts, and the spring is wound to tend to rotate the shaft 10 in the direction in which it is commonly driven.

Under normal driving conditions, therefore, play is prevented from developing between the devices 31 and their respective grooves, and the sudden application of power to the shaft 10 or torque reaction on the shaft 11 is taken up without lost motion, thus greatly minimizing the wearing of the parts. It will be apparent that the spring 34 is not essential to the operation of the universal joint, but its use is advantageous in connection with the universal joint itself since it improves the wearing characteristics very materially, and assists in maintaining perfectly quiet operation of the universal joint.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. A universal joint comprising a socket, a ball arranged in said socket, the opposing faces of said ball and socket having grooves lying in planes coincident with the axes of the socket and ball, and a motion transmitting device arranged in each corresponding pair of grooves, each such device being disk-like in formation, and each having its diameter substantially in a plane passing through the axes of the shafts when the latter are aligned.

2. A universal joint comprising a shaft having a socket thereon, a second shaft having a ball thereon arranged in said socket, the contacting faces of said ball and socket having corresponding grooves lying in planes coincident with the axes of the respective shafts, a non-spherical motion transmitting device arranged in each corresponding pair of grooves, each of such devices having relatively flat opposite faces, and extending flatwise in a plane including the axis of rotation of one of the shafts.

3. A universal joint comprising a shaft having a socket thereon, a second shaft having a ball thereon arranged in said socket, the contacting faces of said ball and socket having corresponding grooves lying in planes coincident with the axes of the respective shafts, and a motion transmitting device arranged in each corresponding pair of grooves, each such device being disk-like in formation and having its peripheral portion of curved cross-section merging into relatively flat opposite faces, and each having its diameter substantially in a plane passing through the axes of the shafts when the latter are aligned.

4. A universal joint comprising a shaft having a socket thereon, a second shaft having a ball thereon arranged in said socket, the contacting faces of said ball and said socket having grooves concentric with the center of said ball and arranged in corresponding pairs, the grooves of said socket and said ball lying in planes coincident respectively with the axes of said first and second named shafts, the bottoms of said recesses being curved in cross-section, and a motion transmitting device arranged in each corresponding pair of grooves, each such device being disk-like in formation and having its peripheral portion in cross-section corresponding generally to the cross-section of the bottoms of said grooves and merging into relatively flat opposite faces.

5. A universal joint comprising a shaft having a socket thereon, a second shaft having a ball thereon arranged in said socket, the contacting faces of said socket and said ball having grooves concentric with the center of said ball and lying in planes coincident with the respective axes of said first and second name shafts, a motion transmitting device arranged in each groove of said socket and the corresponding socket in said ball and spring means tending to impart relative rotation to said shafts.

6. A universal joint comprising a shaft having a socket thereon, a second shaft having a ball thereon arranged in said socket, the contacting faces of said socket and said ball having grooves concentric with the center of said ball and lying in planes coincident with the respective axes of said first and second named shafts, a motion transmitting device arranged in each groove of said socket and the corresponding groove in said ball, and a coiled torsion spring surrounding the axis of one of said shafts and tending to impart relative rotation to said shafts.

7. A universal joint comprising a shaft having a socket thereon, a second shaft having a ball thereon arranged in said socket, the contacting faces of said ball and socket having corresponding grooves lying in planes coincident with the axes of the respective shafts, a motion transmitting device arranged in each corresponding pair of grooves, each of such devices being of greater diameter than thickness, and each having its diameter substantially in a plane passing through the axes of the shafts when the latter are aligned, and spring means constantly tending to relatively rotate said shafts to maintain the devices in snug engagement with their respective grooves.

8. A universal joint comprising a shaft having a socket thereon, a second shaft having a ball thereon arranged in said socket, the contacting faces of said ball and socket having corresponding grooves lying in planes coincident with the axes of the respective shafts, a motion transmitting device arranged in each corresponding pair of grooves, each such device being disk-like in formation and having its peripheral portion substantially of semicircular cross-section, and each having its diameter substantially in a plane passing through the axes of the shafts when the latter are aligned, and a coiled torsion spring surrounding the axis of one of said shafts and constantly tending to relatively rotate said shafts.

9. A universal joint comprising a pair of shafts, a ball fixed on one shaft, a socket receiving said ball and splined on the other shaft, said socket extending on opposite sides of a plane passing through the center of said ball at right angles to the axis of said first named shaft, the contacting faces of said ball and said socket having grooves concentric with the center of said ball and lying in planes coincident respectively with the axes of said first and second named shafts, and a motion transmitting device arranged in each groove of said ball and in the corresponding groove of said socket, each motion transmitting device being of disk-like formation and having its peripheral portion rounding into substantially flat opposite faces, and each having its diameter substantially in a plane passing through the axes of the shafts when the latter are aligned.

10. A universal joint comprising a shaft, a ball having a sleeve extension surrounding the end of said shaft and fixed against rotation with respect thereto, said ball having an axial recess, a screw having its head arranged in said recess and threaded in the adjacent end of said shaft, a socket receiving said ball, said socket extending on opposite sides of a plane through the center of said ball at right angles to the axis of said shaft, a plug in said recess, a thrust ball arranged in said plug and engaging the inner surface of said socket, the engaging surfaces of said ball and said socket having correspondingly arranged grooves, and motion transmitting devices arranged in each groove of said ball and in the corresponding groove of said socket, each motion transmitting device being of disk-like formation with relatively flat opposite faces, extending flatwise across the line of thrust between socket and ball.

11. A universal joint comprising a pair of elements, means connecting said elements in interdriving relation and for universal movement with respect to each other, and spring means constantly tending to rotate said elements with respect to each other.

12. A universal joint comprising a pair of coacting members, motion transmitting means connecting said members for simultaneous rotation and for universal movement with respect to each other, and a torsion spring constantly tending to rotate said members with respect to each other to take up back lash in all relative positions of the members.

13. A universal joint comprising a pair of shafts, a ball carried by one shaft, a socket carried by the other shaft and extending on opposite sides of a plane passing through the center of said ball at right angles to the axis of the first named shaft, the contacting faces of said ball and said socket having grooves concentric with the center of the ball and lying in planes coincident respectively with the axes of said first and second named shafts, a motion transmitting device arranged in each groove of said ball and the corresponding groove of said socket, said ball being provided with an axial recess, means for securing said ball to said first named shaft including a head lying in said recess, a plug mounted in said recess and engaging said head, and a thrust ball carried by said plug and engaging said socket.

14. A universal joint comprising two elements, one intruded into the other, the opposing faces of the elements each provided with a recess, one of the recesses forming a groove extending in a plane containing the axis of rotation of the associated element, and a motion transmitting device arranged in both of said recesses, said device being approximately of disc-like form with its maximum diameter in a plane passing through the axis of rotation of one of the elements and with its minimum diameter at right angles to its maximum diameter.

15. A universal joint comprising two elements having a limited freedom of relative articulation, and means reacting between the elements and tending to cause one to bear rotatively on the other to take up back-lash.

16. In a universal joint, the combination of two elements operatively connected to drive one from the other in different angular positions of their axis of rotation, and a tension spring connecting the elements in all of said angular positions and reacting between the elements rotatively in one direction to maintain the pressure from one element on to the other in all relative positions thereof.

17. A universal joint comprising two elements mounted for relative articulation about a point, said elements provided with registering recesses and a driving connection between the elements contained partly in one recess and partly in its companion recess, one of said recesses forming a groove in a plane containing said point and said driving conection presenting its greatest area of contact surface across its line of transmitted thrust and capable of revolving about said line of thrust.

18. In a universal joint, the combination of a ball provided with an axially extending bore having an enlarged outer end and a reduced portion forming a shoulder, a mounting screw having its shank extending through the reduced portion and its head in the enlarged end engaging said shoulder, a plug fitting in said enlarged end and engaging the screw to hold the same in place.

19. In a device of the class described, the combination of a pair of shafts each adapted to rotate about its own axis and adapted to be relatively moved to cause their axes of rotation to assume an angled relation, a universal joint connecting adjacent ends of the shafts and including coacting elements mounted for articulation about a point in the axes of rotation of both shafts, one element of the joint being fixedly connected to its associated shaft and the coacting element being rotatively fixed but axially slidable on its associated shaft to compensate for relative axial movement of the shafts under varying driving conditions and a torsion spring reacting between the elements of the joint in a direction tending to move said last named coacting element axially along its associated shaft and away from the shaft to which the first named element of the joint is fixed.

LOGAN L. MALLARD.